(12) United States Patent
Vaidyanathan et al.

(10) Patent No.: US 6,524,522 B2
(45) Date of Patent: Feb. 25, 2003

(54) METHOD FOR PREPARATION OF METALLIC FOAM PRODUCTS AND PRODUCTS MADE

(75) Inventors: K. Ranji Vaidyanathan, Tucson, AZ (US); John L. Lombardi, Tucson, AZ (US); Joseph Walish, Miami, AZ (US); Ronald A. Cipriani, Tucson, AZ (US)

(73) Assignee: Advanced Ceramics Research, Inc., Tucson, AZ (US)

( * ) Notice: Subject to any disclaimer, the term of this patent is extended or adjusted under 35 U.S.C. 154(b) by 0 days.

(21) Appl. No.: 10/094,098

(22) Filed: Mar. 7, 2002

(65) Prior Publication Data

US 2002/0192101 A1 Dec. 19, 2002

Related U.S. Application Data

(60) Provisional application No. 60/274,075, filed on Mar. 7, 2001.

(51) Int. Cl.$^7$ .................................................. B22F 3/20
(52) U.S. Cl. ................. 419/2; 419/41; 419/36; 75/228; 264/44; 264/610; 501/80
(58) Field of Search ............... 419/2, 41, 36; 264/44, 610; 75/228; 501/80

(56) References Cited

U.S. PATENT DOCUMENTS

| 4,196,267 A | * | 4/1980 | Watanabe et al. ............. 264/53 |
|---|---|---|---|
| 5,151,246 A | | 9/1992 | Baumeister et al. |
| 5,393,485 A | | 2/1995 | Wörz et al. |
| 5,935,514 A | * | 8/1999 | Ford et al. ............. 264/177.11 |
| 5,976,454 A | * | 11/1999 | Sterzel et al. ............. 264/43 |
| 5,998,317 A | * | 12/1999 | Sterzel ............. 264/44 |
| 6,171,532 B1 | * | 1/2001 | Sterzel ............. 264/43 |
| 6,254,998 B1 | * | 7/2001 | Tuchinsky ............. 264/610 |

OTHER PUBLICATIONS

T. Daxner, H.J. Böhm, and F.G. Rammerstorfer, "Mesoscopic Simulation of Inhomogeneous Metallic Foams with Respect to Energy Absorption," *Computational Materials Science 16*, pp. 61–69 (1999).

T.J. Lu, H.A. Stone and M.F. Ashby, "Heat Transfer in Open–Cell Metal Foams," *Acta Mater.*, vol. 46, No. 10, pp. 3619–3635 (1998).

S. Santosa and T. Wierzbicki, "On the Modeling of Crush Behavior of a Closed–Cell Aluminum Foam Structure," *J. Mech. Phys. Solids*, vol. 46, No. 4, pp. 645–669 (1998).

S.P. Santosa, T. Wierzbicki, A.G. Hanssen and M. Langseth, "Experimental and Numerical Studies of Foam–Filled Sections," *International Journal of Impact Engineering 24*, pp. 509–534 (2000).

* cited by examiner

*Primary Examiner*—Ngoclan Mai
(74) *Attorney, Agent, or Firm*—Banner & Witcoff, Ltd.

(57) ABSTRACT

The present invention relates to the extrusion freeform fabrication of low cost, in situ, metallic foam components having oriented microstructures and improved mechanical properties such as energy absorption and specific stiffness. The present invention relates to the freeform fabrication of metallic foams to form parts having complex geometry that demonstrate superior mechanical properties and energy absorbing capacity.

15 Claims, 5 Drawing Sheets

METHOD FOR PREPARATION OF METALLIC FOAM PRODUCTS AND PRODUCTS MADE

CROSS-REFERENCE TO RELATED APPLICATION

This application is based on, and claims the benefit of, co-pending U.S. Provisional Application Serial No. 60/274,075, filed on Mar. 7, 2001, and entitled "Extrusion Freeform Fabrication Method for Metallic Foam Components Having Oriented Microstructures and Improved Mechanical Properties."

The present invention was made with U.S. Government support under grant Number DAAD19-00-C-0025 and DAAD19-01-C-0054 awarded by the United States Army. Accordingly, the Government may have certain rights in the invention described herein.

FIELD OF THE INVENTION

The present invention relates to the fabrication of low cost, in situ, metallic foam components having oriented microstructures and improved mechanical properties such as energy absorption and specific stiffness.

BACKGROUND OF INVENTION

Cellular metals have been available for decades, but new opportunities for cellular metals are emerging for two reasons. First, novel manufacturing approaches have beneficially affected performance and cost, and second, higher levels of basic understanding about mechanical, thermal and acoustic properties have been developed. These provide an integrated pathway between manufacturing and design.

Cellular metals have high stiffness and yield strength at low density relative to other competing materials and systems. That is, the cellular materials may be laminated between opposed sheets of another material. This creates an opportunity for ultra-light structures, with integrally bonded dense face sheets. In addition, cellular metals have large compressive strains achievable at nominally constant stress. This feature provides for high-energy absorption capacity which is advantageous in crash and blast amelioration systems. These materials may be used effectively for either cooling or heat exchange structures. Further, cellular metals incorporated within a design to form sandwich skins can achieve mechanical performance and affordability goals at lower weight than competing concepts.

One method of making metallic foams involves gas expansion in foam casting. Another method for making metallic foams is based on gas expansion in foam casting or powder metallurgy. According to this method, metal powder is mixed with a foaming agent, for example a gas. Gas pressure is derived by either a dispersed particulate such as $H_2$ from $TiH_2$, high pressure generated within an entrapped inert gas, or a gas injected into a liquid metal. This mixture can then be extruded or cast into the structural shape required. It is very difficult to control pore size or orientation using these known techniques.

The powder metallurgical Fraunhofer-process is another method used to create metallic foams. In this method, a foaming agent is added to a metal powder that is then mixed. This mixture can then be compacted or extruded into sheets or bars that can then be formed into the component shape using conventional molding techniques. Again, this process has little control of the pore size or orientation, and it is expensive if used to create geometrically complex parts due to the molds required.

Recently, another method, termed the GASAR process, has been developed that provides a means for control of pore shape and orientation. However, because the process involves the use of molten metals and the injection of gases, it is a technically complex and expensive process. Furthermore, the GASAR process allows the use of only one pore or cell orientation in a component and the shapes of the components are generally limited to plates, rods, and tubes.

While others have developed processes for the fabrication of metallic foam structures with oriented porosity, none of those processes are capable of creating a combination of open and closed cell porosity, nor are they capable of creating components directly from CAD designs. Additionally, control of pore size and pore orientation is difficult. Moreover, conventional processes do not provide for the fabrication of integral structures with a metallic foam skin in a cost-effective manner. Consequently, there is a need for a fabrication process that can produce complex metallic foam components with optimized dynamic mechanical properties in a cost-effective manner.

Further, there is a need to fabricate metallic foam structures that have both open and closed cell porosity. Open porosity is characterized by the amount of surface area that is accessible by a gas or liquid if the structure were to be immersed in it, while closed porosity is the porosity in the structure not accessible to a gas or liquid. The size, distribution, and aspect ratio of close-celled porosity in a foamed material can have a direct effect on its energy absorbing and blast amelioration capability and other mechanical properties such as compressive strength.

SUMMARY OF THE INVENTION

The present invention overcomes the problems encountered with conventional methods and compositions by providing an efficient, cost-effective process for preparing complex metallic foam components with optimized dynamic mechanical properties. More specifically, the invention provides methods and compositions for metallic foam components. In particular, the present invention relates to the freeform fabrication of metallic foams to form parts having complex geometries that demonstrate superior mechanical properties and energy absorbing capacity. Metallic foam components can be used in a wide range of applications, for example, applications such as antenna masts and fins, wings, exhaust ducts, electronic chassis components, and ribbed heat diffusers for state of the art lighting fixtures.

Further, this method presents a cost-effective method of producing ultra-lightweight structures directly from CAD designs and offers the ability to manufacture complicated shape prototypes with minimal post-processing steps. In addition, the present invention provides methods and compositions of metallic foams that have both open and closed cell porosity, which has a direct effect on its energy absorbing and blast amelioration capability and other mechanical properties such as compressive strength.

Accordingly, an object of the present invention is to fabricate metallic foam components with optimized mechanical properties in an efficient, cost-effective manner.

Another object of the present invention is to fabricate metallic foam components that display increased energy absorbing and other mechanical properties based on the foam having both open and closed porosity.

DETAILED DESCRIPTION OF INVENTION

Figure 1:
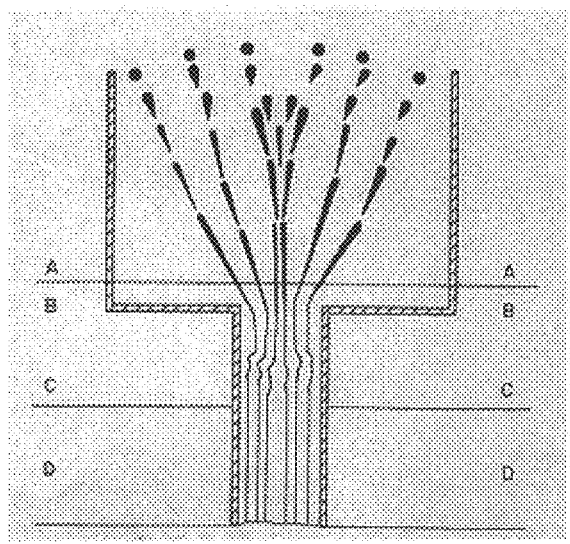
FIG. 1 is a schematic describing the fibrillation of a composite polymer blend through an extrusion orifice in accordance with the present invention.

The present invention relates to a process that enables the manufacture of low cost, in situ, metallic foam components having oriented microstructures and improved mechanical properties such as energy absorption and specific stiffness. The invention is not material specific, and it can be used with a wide range of metals and alloys. Further, the present invention relates to composites and alloys formed having oriented microstructure that are manufactured according to the present method.

In the practice of the invention, a blend is formed using a metallic or other pre-alloyed powder, one or more polymer binders, and an additional compound that is immiscible with the polymer binder. Numerous metals and metal alloys can be used in this invention. Metals and alloys that can be used include, but are not limited to, Al, Cu, Mg, Sn, Ti, Zn, and combinations including alloys thereof. Further, composites and pre-alloyed powders can also be used, including stainless steel, Ti64 (Ti-6Al-4V), and numerous others. A preferred alloy contains aluminum powder with Cu, Si, Sn, and/or Mg, such as a composition containing aluminum and 8 wt % of Mg and 8 wt % of Sn. Another preferred alloy blend contains aluminum and 4 wt % Cu alloy. By using a eutectic alloy composition, it is easier to break the oxide layer on top of the aluminum powder, and thus improve the sinterability of the composition. Additionally, the sintering temperature of the composition is reduced in the described combinations. Furthermore, the eutectic compositions provide higher strength aluminum alloys compared to pure aluminum thus, making it possible to obtain metallic foam components with better energy absorption capability. Further, ceramic materials, including but not limited to, silicon nitride and silicon carbide, may also be used in the practice of this invention.

The polymer binder of the blend functions to suspend the metallic or ceramic powder. Polymer binders that can be used include, but are not limited to, PMMA (polymethyl methacrylate), EVA (ethyl vinyl acrylate), EEA (polyethylene ethacrylate), PEOx (poly-2-ethyl-2-oxazoline), PEG (polyethylene glycol), polystyrene, microcellulose, and other polymers suitable for use with metal injection molding and combinations thereof.

The additional compound of the composite blend can be selected from a broad variety of compounds, as long as it remains generally immiscible with the polymer binder and metallic or ceramic powder when blended together. Further, it should be generally non-reactive with the metallic or ceramic powder. The additional compound can be a polymer binder selected from those polymers binders previously listed, as long as it is generally not miscible with the first polymer binder used in the blend. Examples of combinations of polymer binders that can be used include polystyrene and PEOx, microcellulose and PMMA, and PMMA and zylene. The additional compound also can be polymer-immiscible material including, but not limited to, camphor, xylene, butyl oleate, and foaming agents such as carbamide (urea), ammonium hydrogen carbonate, and titanium dihydride. When including materials such as xylene, polyethylene glycol, and butyl oleate, or other additives like Al 3 wax, these materials can serve as compatibilizers between the separate phases of the blend and may also assist in dispersing the powders more effectively and reducing the viscosity of the entire blend.

The composite blend typically includes two or more generally immiscible components, preferably to provide a major phase and a minor phase. The major phase includes a polymer binder. Preferably, the major phase is present in at least two-fold excess compared to the minor phase, though other ratios can be used depending on the components of the blend. For example where carbamide, titanium dihydride or ammonium hydrogen carbonate are used as the minor phase, a smaller amount is needed for the minor phase, typically less than 1% by volume of the total blend. Examples of major and minor phases for aluminum foam materials include PEOx with polystryene, and PMMA with titanium dihydride. Examples for stainless steel metallic foam include PPMA with polyethylene glycol and PMMA with ammonium hydrogen carbonate. The major polymer phase acts as a carrier for the metallic particles after blending and to assist in the extrusion. The minor phase is typically present as discrete droplets or particles dispersed in the major phase, which is a type of microstructure that is typically encountered in blends composed of two immiscible phases where the minor phase adopts a spherical morphology to minimize its surface area and energy. During extrusion, the minor phase may become aligned, e.g. elongated and positioned, in the direction of extrusion.

The composite blend is prepared by melting the polymer binder blend in a high shear mixer, such as a Brabender high-shear mixer, and then adding the metallic or ceramic powder. In order to ensure desired homogeneity of the blend, the material may be rebatched (material is removed from the mixing head, the mixing head is cleaned, and the material is put back into the head for further mixing). Upon completion of the rebatching, the blend is allowed to cool and then taken out of the mixing head. Preferably, the metal powder mixes with the major-phase polymer binder, with only limited or no mixing into the minor phase.

To form the structures of the present invention, the composite blend can be processed using any known process, such as, for example, low-pressure injection molding or a ribbon or filament deposition processes. One such process is an extrusion freeform fabrication (EFF) process for forming three-dimensional objects. An EFF process can be adapted to allow for rapid fabrication of functional components from the composite blends of the present invention. Such a process allows for the sequential deposition of multiple layers of the compositions to form complex-shaped structures, as desired. Preferably, the EFF process equipment includes a fabrication modeler fitted with a high-pressure extrusion head to allow for extrusion of the highly viscous polymer systems of the present invention. For example, a Stratasys Fused Deposition Modeling Device can be adapted to use a high-pressure extrusion head, which assists in extruding the highly viscous metal powder-polymer binder blend. Any method with a high-pressure extrusion head may be used.

Generally, a pre-formed feed rod is prepared from the composition and passed to the EFF apparatus. Alternatively, the components of the composition, including polymer materials and additives, can be passed directly to the apparatus for a continuous process. The feed rod is passed through an extrusion apparatus where an extrusion head of the apparatus deposits the extruded composition onto a work or support surface. The ribbons or filaments of extruded material generally are deposited layer upon layer onto the work or support surface in a predetermined pattern to form an object of the desired shape and size and having the desired porosity characteristics. Preferably, the extruded material is deposited so that the longitudinal axis of the extruded material is generally parallel to the work surface.

Depending upon the particular processing conditions employed, the minor phase of the polymer binder blend has the tendency to become deformed when subjected to shear conditions. The amount of deformation experienced by these droplets is a strong function of the shear stress rate imparted to the blend, the viscosity of the individual polymers constituting the blend, and the diameter of the minor phase material. Therefore, the high-pressure extruder head is highly desirable in order to be able to extrude high polymer binder content viscous systems while being able to maintain precise alignment of the minor-phase fibril in the extrusion direction.

A relationship detailing the elongation of a minor phase droplet in a polymer blend when subjected to shear stress is as follows:

$\epsilon(t) = \chi I(t) (19\lambda + 16)/(16\lambda 16$, where $\epsilon(t)$: droplet elongation as a function of time $\lambda$: ratio of major phase to minor phase of apparent polymer shear viscosities $\chi$: $\sigma d/\gamma$; shear stress($\sigma$)*droplet diameter (d)/interfacial tension ($\gamma$)

I(t): time dependent integral: $1 - \exp(-40\epsilon' t/19\lambda\chi)$, where $\epsilon'$ is the deformation rate As this relationship demonstrates, these factors are strongly dependent upon blend extrusion conditions. The polymer component viscosity and interfacial tensions are influenced by extrusion temperature, while shear stress imparted to the blend increases with extrusion pressure and decreased extruder orifice diameter. Initial (quiescent) droplet diameter of the minor blend component is dependent upon the relative concentration of the minor phase in the blend. The morphology of these droplets is therefore strongly influenced by the amount of shear imparted to the polymer.

When a blend is initially stressed, the spherical droplets become elongated into an ellipsoidal geometry. Increased stress causes the ellipsoids to become oriented with their major axes parallel to the polymer extrusion direction. These ellipsoids become elongated into long continuous fibrils which are oriented parallel to the flow direction. The transition between spherical minor phase to ellipsoids and subsequent fibrillation while extruding a composite blend through a nozzle is illustrated in FIG. 1.

In the present invention, the minor phase undergoes fibrillation when subjected to high shear extrusion through the high-pressure extrusion head. Preferably, this shear force aligns the minor phase along the extrusion direction as the feed rod passes through the orifice of the high-pressure extrusion head. Because the high-pressure extrusion head allows the orientations of the fibrils to be manipulated, a tailored microstructure with specified material properties will result. Accordingly, the extrusion head provides the ability to tailor the microstructure.

Depending on the materials used, extrusion temperatures can vary widely. For example, for an EEA binder, the composite blend can typically be extruded at temperatures between about 125–150° C., though others blends may require temperatures up to at least about 225–250° C. The extrusion temperature is dependent at least in part on the melting temperature of the binder system and the particle size distribution of the powder. A preferred extrusion temperature is less than about 200° C., and a preferred particle size for the powders would be between about 20–44 $\mu$m with an average particle size of about 30 $\mu$m.

After passing through the high-pressure extrusion head, the extruded composite blend is deposited in a controlled manner onto a working surface. If desired, the extruded composite blend may then be formed into parts forming a final component directly from CAD designs. It is thus desirable that the system has hardware capable of processing CAD drawings so that the form, such as a mesh-like structure, can be built by a rapid prototyping process. The extruded composite blend can be used to fabricate parts in a layer-wise fashion by the sequential stacking of discrete extruded raw material layers upon each other until the final component part is formed. Each layer has a geometry corresponding to a horizontal cross section of the desired prototype. In this manner, geometrically complex parts are manufactured with complex and varying orientations of microstructure. Preferably, the composite blend is deposited in such a way as to provide a mesh-like or similar structure having the desired overall geometry. The mesh-like formation of the structure, as compared to a solid structure, provides an additional level of porosity in the structure. This porosity, also referred to as "open porosity" should preferably be between about 30 to 70%, with pore sizes ranging between about 100–1000 $\mu$m.

Use of a high-pressure extrusion head allows extrusion of highly viscous polymer binder systems while maintaining the precise alignment of the minor-phase fibril in the extrusion direction. This allows the manufacture of geometrically complex parts with varying orientations of microstructure.

The closed porosity in the component part is obtained during the processes used to finish the part, including heating and subsequent cooling. Material densification and consolidation of the extruded part is achieved through a binder burnout and sintering process. The extent of open porosity of the final component increases with the removal of the binder during the burnout stage.

Figure 2:
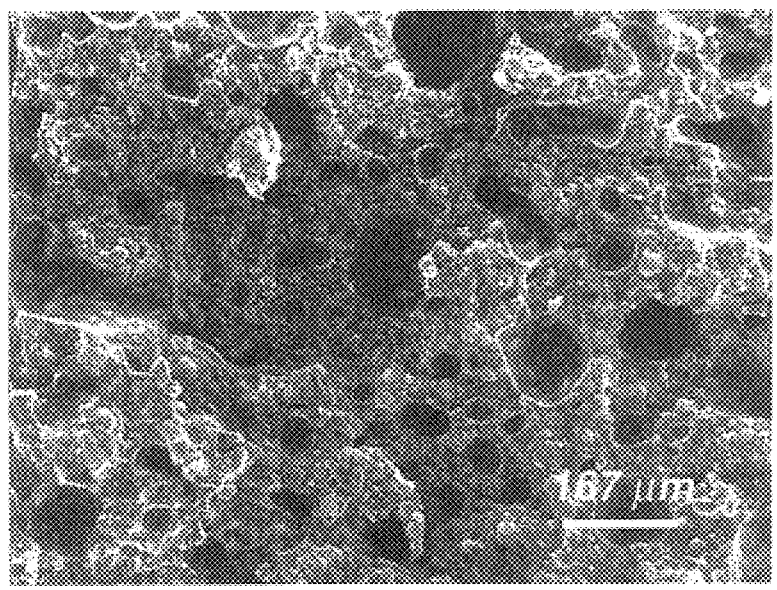
FIG. 2 is a cross-sectional scanning electron microscope (SEM) image of unsintered Al-Cu foam fabricated according to this method showing closed cell porosity.

During the binder burnout process, the rods or fibrils become elongated holes in the composite material, thereby providing the closed porosity, as seen in FIG. 2. As previously explained, closed porosity in a structure is not accessible to the outside and is completely enclosed in the final metal structure. During the burnout, the fibrils of the minor compound become shaped gas pores to provide a metallic foam. Preferably, burnout is performed in either flowing nitrogen or flowing nitrogen with about 5% hydrogen, and the components are supported in a powder bed of titanium sponge held in a ceramic crucible. Preferably, the crucible is made of alumina, though other crucible materials may be used. The burnout is followed by furnace cooling.

The temperature required for binder burnout varies with the materials used. By way of example, PMMA requires a maximum temperature in the range of about 430–450° C. while EVA and EEA type polymers require a maximum temperature in the range of about 600–630° C. Modifications in the burnout schedule may be desired to further optimize the pore-size to burnout schedule.

Depending on the compositions, a cycling burnout schedule may be required to achieve desired results. This involves a schedule of incremental raises in the temperature, each followed by holding at specific temperatures. Preferably, cycling burnout schedules with incremental temperature changes and holding at certain temperatures, as opposed to heating at one constant temperature, are used. The cycling burnout schedule, including the amount of incremental temperature increase as well as the maximum temperature required, will depend on the particular materials used.

Figure 3:
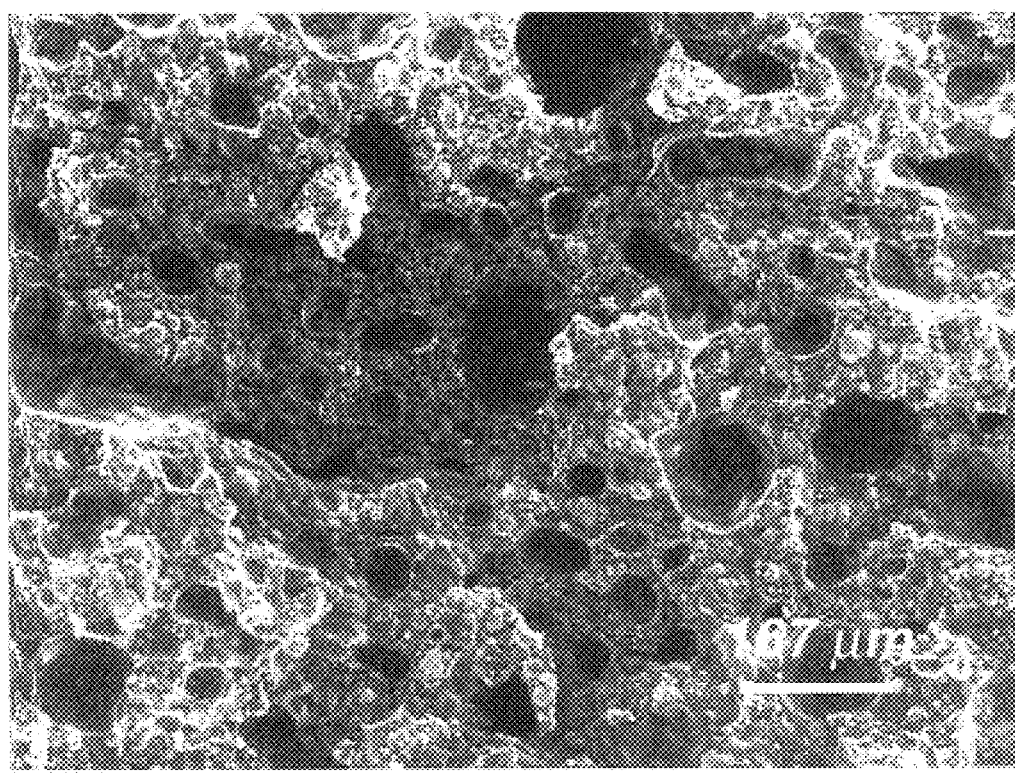
FIG. 3 is a cross-sectional SEM image of an aluminum foam fabricated according to this method showing closed cell porosity and showing the larger pore sizes formed after exposure to a higher temperature.

Cycling burnout schedules have been found to increase closed porosity. Closed porosity may increase with holding the burnout temperature at about 150–190° C. This temperature is dependent on the temperature stability of the minor phase. Burnout cycles are typically completed by about 450° C., which is well below the temperature required for the sintering of the metallic foam components. Further, pore size increases with increasing time of exposure and temperature in the range of about 150–190° C. It is hypothesized that the minor phase is removed in this temperature range, and the resultant gas in the enclosed porosity expands within the major phase, thus leading to larger porosity after a longer hold at between about 150–190° C. This is shown by comparing the size of the pores in FIGS. 2 and 3. Compared to the porosity size in FIG. 2, which was heated at about 150° C., holding the temperature at 190° C. for the same time duration yielded larger porosity, as shown in FIG. 3. Similar effects would likely be observed with a longer hold time at the same temperature.

The binder burnout process is followed by furnace cooling. After furnace cooling, the component can be sintered to fully consolidate. The sintering process can occur in flowing nitrogen and can be conducted in the same crucible used for the binder burnout. Depending on the materials and conditions, various sintering temperatures may be used. For example, for aluminum the temperature should be about 625° C., for aluminum alloys the temperature should be about 625–650° C., for copper alloys the temperature should be about 850–950° C., and for stainless steel the temperature should be about 1250–1350° C.

The structures preferably have open pore sizes ranging from about 100–1000 µm or larger, corresponding to porosity levels between about 30–70%, and closed pore sizes ranging from about 50–150 µm. The porosity levels and the pore size can be controlled by modifying the binder composition and are related to the hold temperature during the binder burnout stage.

The closed porosity in the component parts during burnout typically is spherical and of higher aspect ratio, which provides better energy absorption capability than currently available metallic foams with irregular or hexagonal shaped open cells. Closed porosity provides improved energy absorption capabilities as compared to open porosity. This is closely related to the aspect ratio of the cells themselves, the aspect ratio being the cell wall thickness divided by the length of the cell. Circular cells have the capability to absorb more impact energy than hexagonal cells that are intrinsically unstable. Spheroidal cell walls are thicker on average, and the reduced section thickness is too short to lead to compressive instability. In fact, spheroidal walls may experience some plastic deformation prior to cell wall rupture. The size, distribution, and aspect ratio of closed-celled porosity in a foamed material can have a direct effect on its energy absorbing and blast amelioration capability and other mechanical properties such as compressive strength.

Figure 4:
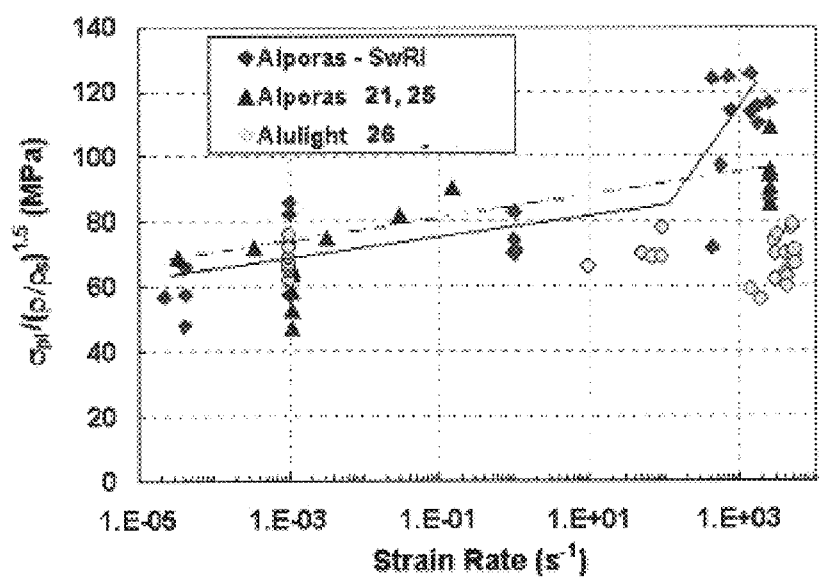
FIG. 4 is a plot showing normalized stress verses strain rate for ALPORAS and ALULIGHT foams showing strain rate dependence for the higher density ALPORAS closed cell foam.

Without wishing to be bound by any theories, it is believed that higher density and higher specific strength closed-cell foam materials provide improved energy absorption as compared to open-celled foams or low density closed-cell foams. The increased energy absorption capability is directly related to the increases in plateau stress and strain. This effect is believed to be due to the spheroidal cell walls being thicker on average and the reduced section thickness being too short to lead to cell wall buckling. For the same density, a foam material with a higher amount of closed-cell porosity will also generally have a higher compressive strength compared to an open-cell porous material, which is much weaker than a closed-cell foam material with the same amount of porosity. For example, the strain rate dependence of yield strength for closed cell ALPORAS foam is shown in FIG. 4. In this figure, the y-axis in the plot is the normalized plateau stress. It is normalized based on the relative density of the specific foams. The other types of foams shown in FIG. 4 are of the open porosity variety.

The following examples are intended to illustrate the present invention and should not be construed as in any way limiting or restricting the scope of the present invention. The following examples illustrate formulations of the composites that can be used in preparing metallic foam. Further, some of the examples illustrate burnout schedules that can be used to achieve sufficient porosity.

EXAMPLES

Example I

This example illustrates a blend formulation that can be used to make metallic foam. As shown in Table I, aluminum powder was blended with copper powder to produce an Al-4 wt % Cu alloy blend. The copper powder was added to the aluminum powder to create an alloy composition that would be more readily sinterable than pure aluminum alone. The aluminum and copper powders were similar in size. The Al and Cu powders were approximately 45 µm size particles, with an average particle size of 10 µM. The polymer (water-soluble) is a multi-component mixture. It was first melted in a Brabender high-shear mixer and the aluminum-copper powder mixture was then added as carefully as possible.

TABLE I

Batch Size (cc): 42
Batch Temperature (° C.): 150
Batch Speed (rpm): 60

|  | Density g/cc | Weight % | Volume % | Actual V | Actual W |
|---|---|---|---|---|---|
| Aluminum | 2.702 | 95.5 | 0.542 | 22.78 | 61.54 |
| Copper | 8.96 | 4.5 | 0.008 | 0.32 | 2.90 |
| PMMA | 1.14 |  | 0.450 | 18.90 | 21.94 |
| Total |  | 100 | 1.000 | 42.00 | 86.38 |

After compressing the composite blend into feed rods, they were extruded at temperatures of about the 225–250° C.

Next, the binder burn-out was performed using either flowing nitrogen or flowing nitrogen with 5% hydrogen, followed by furnace cooling. Using this formulation, the cycling binder burnout schedule in Table 11 was used.

TABLE II

| Temperature range (° C.) | Ramp rate/hr | Total time (hr) |
|---|---|---|
| 30–270 | 30° C. | 8 |
| Hold | — | 2 |
| 270–400 | 10° C. | 13 |
| Hold | — | 1 |
| 400–430 | 30° C. | 1 |
| Hold | — | 1 |

FIG. 2 shows a cross-sectional scanning electron microscope image of an aluminum foam with closed porosity fabricated according to this invention.

Example 2

This example illustrates another blend formulation that can be used to make metallic foam. As shown in Table III, aluminum was used as the primary metallic powder with small amounts of Mg and Sn added to the aluminum in an effort to reduce oxide layers formation on the metallic powder. In this example, the composite blend contained 8 wt % of Mg and 8 wt % of Sn. Additionally, Mg and Sn form a eutectic alloy with Al well below the maximum binder burnout temperature, thus allowing the foam material sufficient structural rigidity to be handled between the binder burnout and sintering steps.

This formulation used the polymethylmethacrylate (PMMA) as the polymer binder. Although PMMA has a relatively high viscosity, it was used as the polymer binder because it has clean burn-off characteristics. In this example, the xylene also served to reduce the viscosity of the PMMA.

TABLE III

| Material | Density (gm/cc) | Volume % | Weight % | Weight (gm) |
|---|---|---|---|---|
| Al | 2.702 | 43.7500 | 67.1 | 49.64925 |
| Sn | 7.31 | 1.50 | 6.2 | 4.6053 |
| Mg | 1.738 | 4.75 | 4.7 | 3.46731 |
| PMMA | 1.1 | 35.25 | 22.0 | 16.2855 |
| Xylene | 0.86 | 14.75 | 7.2 | 5.3277 |
| Totals | | 100.00% | 100% | 74.01 |

Figure 5:
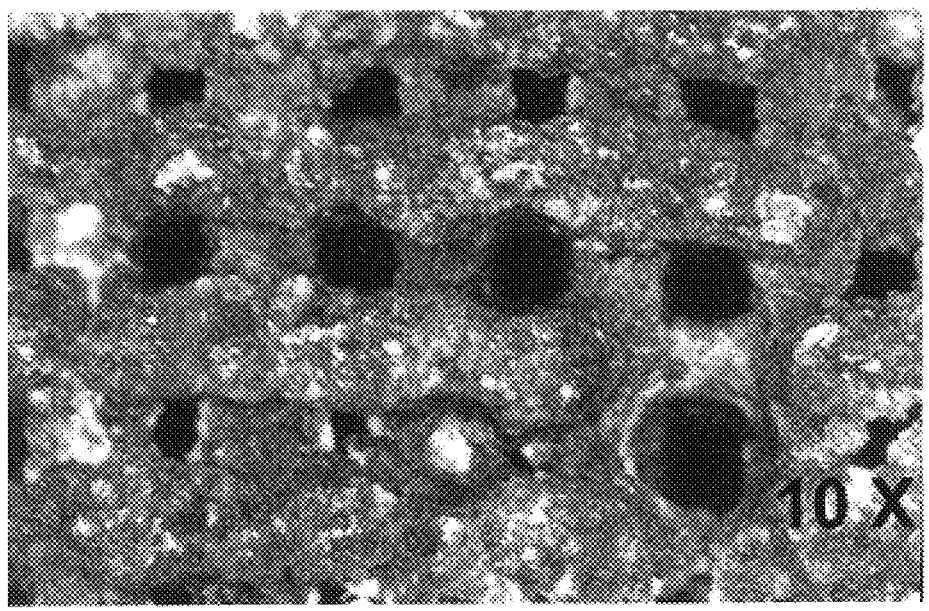
FIG. 5 shows open porosity from a fully sintered aluminum foam sample.

After compressing the composite blend into feed rods, they were extruded at temperatures of about 225–250° C. The extrusion process was observed to watch for breakdown of the binder system in this temperature range. Next, the binder burn-out was performed using either flowing nitrogen or flowing nitrogen with 5% hydrogen, followed by furnace cooling. Using this formulation, the cycling binder burnout schedule in Example 1 was successfully used. FIG. 5 shows the open porosity of a fully sintered aluminum foam component with the composition in Table III using the binder burnout schedule from Table II after sintering at 625° C. in flowing nitrogen.

Example 3

Metallic foam components were made using the formulation in Table IV. The major binder phase was PMMA and the minor binder phase was butyl oleate. The same general procedure as in the previous examples was used with this formulation.

TABLE IV

| Material | Density (gm/cc) | Volume % | Weight % | Weight (gm) |
|---|---|---|---|---|
| Al | 2.702 | 43.75 | 62.1 | 49.65 |
| Sn | 7.31 | 1.50 | 5.8 | 4.61 |
| Mg | 1.738 | 4.75 | 4.3 | 3.47 |
| PMMA | 1.1 | 40.00 | 23.1 | 18.48 |
| Al 3 wax | 0.92 | 5.00 | 2.4 | 1.93 |
| Butyl Oleate | 0.855 | 5.00 | 2.2 | 1.8 |
| Totals | | 100.00% | 100% | 74.01 |

Further, this formulation permitted the use of enhanced extrusion conditions and the use of a smaller extrusion tip with a 0.012" extrusion nozzle. This formulation was successfully extruded at 200° C. and 275–300% flow. This formulation and extrusion conditions provided a smoother surface finish after extrusion.

The burnout schedule, shown below in Table V, was used for this formulation. The burnout was performed in either flowing nitrogen or flowing nitrogen with 5% hydrogen, followed by cooling. The hold times listed in Table V can be adjusted in proportion to the dimensions of the sample.

TABLE V

| Temperature range (° C.) | Ramp rate/hr | Total time (hr) |
|---|---|---|
| 30–170 | 20° C. | 7 |
| Hold | — | 2 |
| 170–270 | 25° C. | 4 |
| Hold | — | 2 |
| 270–400 | 10° C. | 13 |
| Hold | — | 1 |
| 400–430 | 15° C. | 2 |
| Hold | — | 1 |

Figure 6:
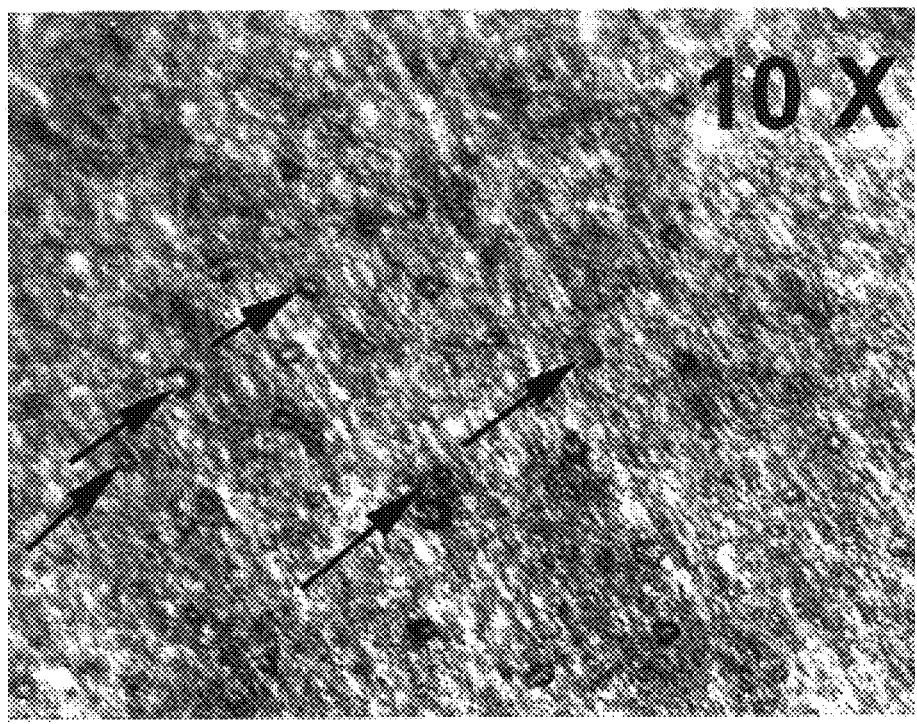
FIG. 6 is a longitudinal cross-sectional view of a fully sintered aluminum foam sample sintered to 625° C. in flowing nitrogen, showing closed porosity.
Figure 7:
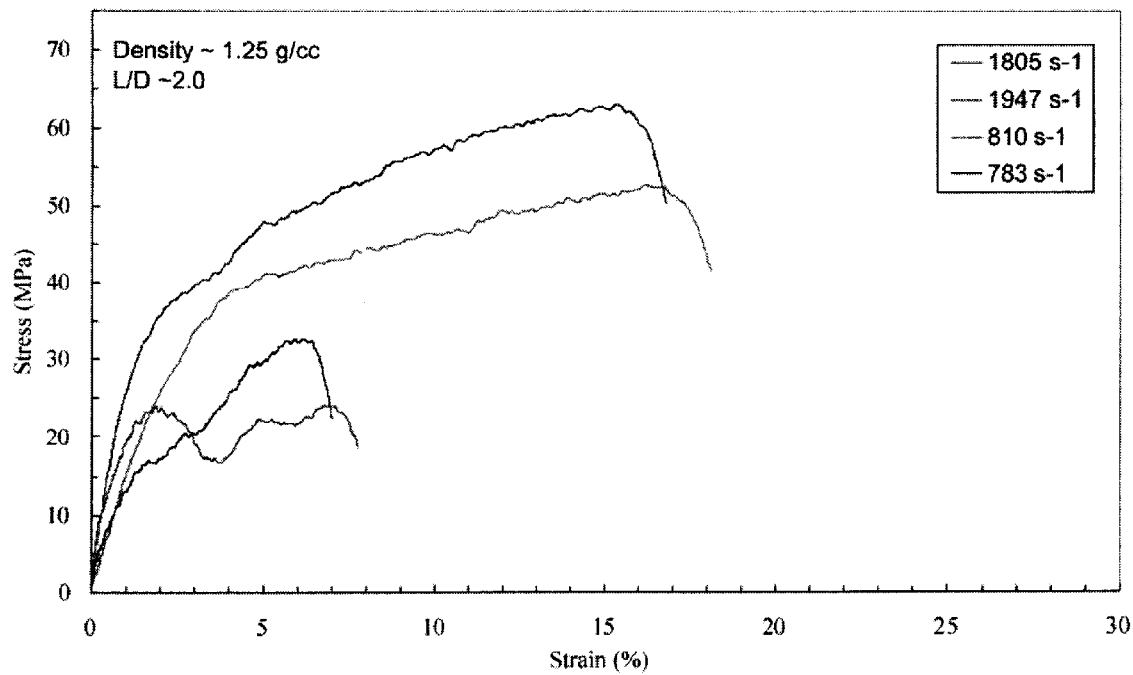
FIG. 7 is a plot showing Split Hopkins Pressure Bar (SHPB) compression test results at high strain rates for aluminum foam fabricated according to this invention with L/D ~2.0 and density ~1.25 g/cc.
Figure 8:
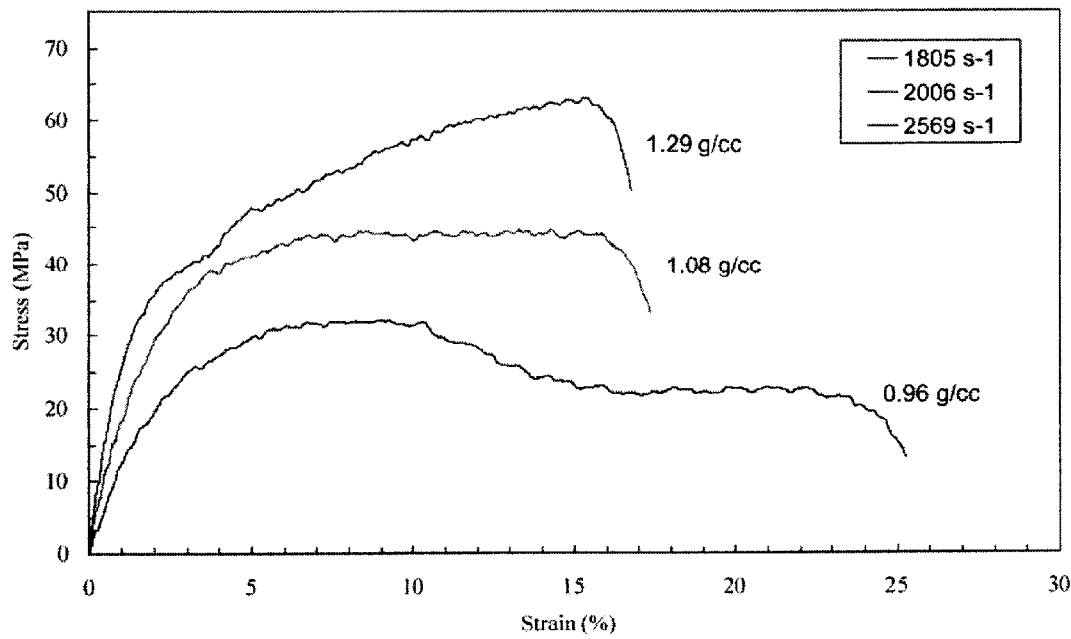
FIG. 8 is a plot of SHPB compression tests conducted at high strain rates as a function of density, showing the effect of density.
Figure 9:
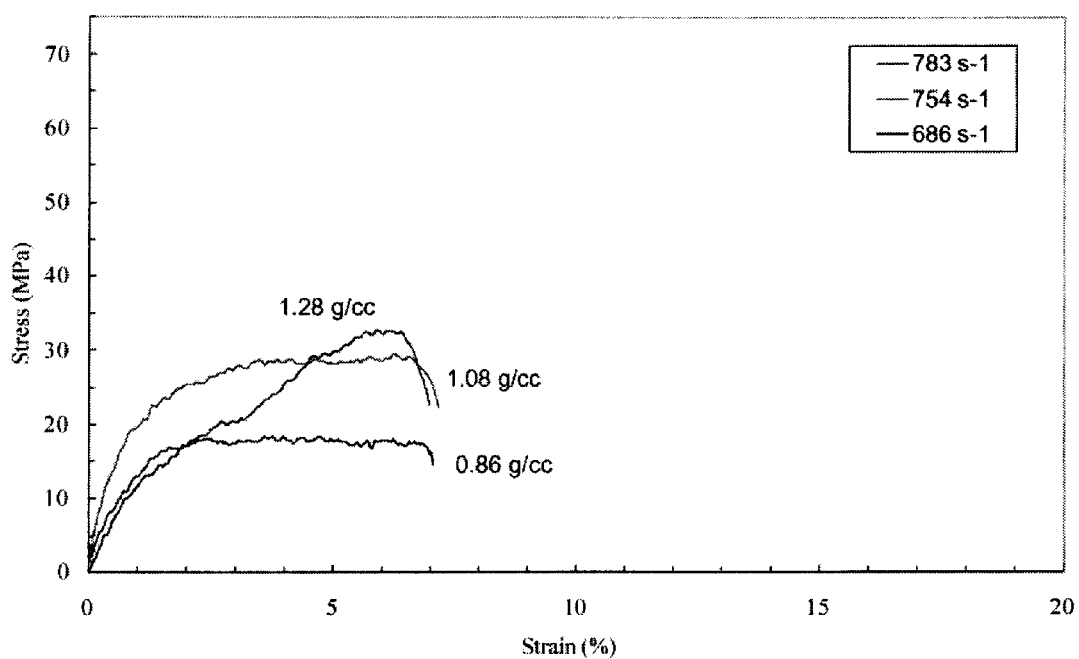
FIG. 9 is a plot of SHPB compression tests conducted at slower strain rates compared to samples in FIG. 8, which show the effect of density.

FIG. 6 shows a longitudinal cross-sectional view of a fully sintered aluminum foam sample according to this example. Dynamic Split Hopkins Pressure Bar (SHPB) strain rate test results obtained from this formulation are similar to those shown in FIGS. 7 through 9.

Numerous modifications and variations may be made in the techniques and structures described and illustrated herein without departing from the spirit and scope of the present invention. Thus, modifications and variations in the practice of the invention will be apparent to those skilled in the art upon consideration of the foregoing detailed description of the invention. Although preferred embodiments have been described above and illustrated in the accompanying drawings, there is no intent to limit the scope of the invention to these or other particular embodiments. Consequently, any such modifications and variations are intended to be included within the scope of the following claims.

What is claimed is:

1. A method of fabricating a porous structure comprising, in combination:
   (a) blending a structure forming powder, one or more polymer binders, and an additional compound that is generally immiscible with the powder and polymer binder to provide a dispersion;
   (b) extruding the dispersion through a dispensing head;
   (c) depositing the extruded dispersion onto a working surface in a predetermined pattern to form a composite object; and
   (d) heating the composite object to a temperature effective for vaporizing the additional compound to provide a finished object having internal porosity.

2. The method of claim 1, wherein the heating step includes heating the object to a first predetermined temperature, maintaining the temperature for a predetermined time and heating to a second predetermined temperature greater than the first predetermined temperature, wherein the heating and maintaining steps are repeated as desired to reach a final temperature.

3. The method of claim 1, wherein the additional compound is present as droplets within the polymer binder and the droplets become elongated and directionally aligned during extrusion.

4. The method of claim 1, wherein the polymer binder is removed from the composite object by heating.

5. The method of claim 1, wherein the structure forming powder is selected from the group consisting of Al, Cu, Mg, Sn, Ti, Zn, metal alloys, stainless steel, silicon nitride, silicon carbide, and combinations thereof.

6. The method of claim 1, wherein the one or more polymer binders are selected from the group consisting of polymethylmethacrylate, ethyl vinyl acrylate, polyethene ethacrylate, poly-2-ethyl-2-oxazoline, polyethylene glycol, polystyrene, microcellulose, and combinations thereof.

7. The method of claim 1, wherein the additional compound is selected from the group consisting of polymethylmethacrylate, ethyl vinyl acrylate, polyethene ethacrylate, poly-2-ethyl-2-oxazoline, polyethylene glycol, polystyrene, microcellulose, camphor, titanium dihydride, carbamide, ammonium hydrogen carbonate, xylene, butyl oleate and combinations thereof.

8. The method of claim 1, wherein the finished object includes internal pores having diameters of between about 50 to about 150 $\mu$m.

9. The method of claim 1, wherein the internal porosity of the finished object is between about 30 to about 70%.

10. The method of claim 1, including depositing the extruded dispersion in one or more layers to form the composite structure, wherein the one or more layers are deposited to provide a matrix arrangement having structural porosity for increasing the surface area of the composite structure.

11. The method of claim 10, wherein the matrix arrangement includes openings having a maximum dimension of between about 100–1000 $\mu$m.

12. A porous material structure formed by the method of claim 1.

13. A metallic foam object formed by the method of claim 1.

14. A porous metallic object formed by the steps comprising:
(a) blending a structure forming powder, one or more polymer binders, and an additional compound that is generally immiscible with the powder and polymer binder to provide a dispersion;
(b) extruding the dispersion through a dispensing head, wherein the additional compound is present as droplets within the polymer binder and the droplets become elongated and directionally aligned during extrusion;
(c) depositing the extruded dispersion onto a working surface in a predetermined pattern to form a composite object; and
(d) heating the composite object to a temperature effective for vaporizing the additional compound and for removing the polymer binder to provide a finished object having internal porosity.

15. The object of claim 14, including depositing the extruded dispersion in one or more layers to form the composite structure, wherein the one or more layers are deposited to provide a matrix arrangement having structural porosity for increasing the surface area of the composite structure.

* * * * *